UNITED STATES PATENT OFFICE.

SIMON RIESER, OF MIDDLETOWN, CONNECTICUT, ASSIGNOR TO THE NEW ENGLAND ENAMELING CO., A CORPORATION OF CONNECTICUT.

PROCESS FOR PRODUCING A SINGLE WHITE-ENAMEL COAT ON STEEL.

1,360,317. Specification of Letters Patent. Patented Nov. 30, 1920.

No Drawing. Application filed November 21, 1916. Serial No. 132,562.

*To all whom it may concern:*

Be it known that I, SIMON RIESER, a citizen of the United States, and a resident of Middletown, county of Middlesex, State of Connecticut, have invented certain new and useful Improvements in Processes for Producing a Single White-Enamel Coat on Steel, of which the following is a specification.

My invention relates to an improved process for producing a single white enamel coat on steel and to the resulting product; also to an improved process for making a batch or mix suitable for use in producing a single white enamel coat on steel and to the resulting improved batch or mix; also to an improved process for producing mill contents suitable for use in producing a single white enamel coat on steel and to the resulting ground frit produced thereby.

It consists in the novel processes and products hereinafter set forth.

Although many attempts have been made to produce a single white enamel coat on steel, it has heretofore been found impossible to do so on a practical commercial scale or to produce a single white enamel coat on steel that would be durable or that would be and remain free from mottling or staining. Whenever a single enamel coat has been applied directly to the steel, it has been found impossible, either to produce a color sufficiently light, or to prevent the lightening properties of the materials used being lost or destroyed in the process of manufacture, or to prevent such white enamel coat from mottling or staining, or to make such white enamel coat durable or possessed of sufficient sticking properties to remain intact upon the steel in practical use. Either the batch or mix has not been such as to permit the finished single coat to become white or to remain white, or the light color obtained during the process of manufacture has been destroyed, or the enamel coat has not possessed sufficient sticking properties, or appears as a mottled or stained coat, or becomes so after being produced, or will finish as a rough, pitted surface.

By my improvement, all of these difficulties are overcome. A single white enamel coat upon steel is produced, which, while having the necessary sticking qualities, appears and remains white without mottling or staining, and is durable in practical use. The finished article is as durable and useful and presents as white a surface as white enameled steel surfaces which have heretofore been produced by using more than one coat, and the manufacture of the same is less complicated and much cheaper.

I will now proceed to explain my improved process and product in their preferred form, although it will be understood of course, that many variations may be made in the materials used, in their proportions, and in the specific steps taken, without departing from my invention.

Referring now specifically to such preferred form of my improved process, I first make a batch or mix that will, when melted, ground and mixed with the white-color-giving constituents, permit such constituents to impart a white color to the finished enamel coat. This I obtain by using the materials hereinafter set forth for the mix, or their equivalents.

I have found in practice that the following materials, with the proportions stated for each, give satisfactory results when used as a batch or mix, namely:—

| | |
|---|---|
| Borax | 270 lbs. |
| Feldspar | 336 lbs. |
| Quartz | 120 lbs. |
| Soda ash | 90 lbs. |
| Fluorspar | 26 lbs. |
| Bone ash | 40 lbs. |
| Refined sodium nitrate | 30 lbs. |
| White antimony $Sb_2O_3$ or oxid of antimony $Sb_2O_4$ | 52 lbs. |
| Ammonium carbonate | 8 lbs. |
| Black oxid of cobalt $Co_2O_3$ | 4 oz. |

Some of the above ingredients are used in making the batch or mix commonly employed for the ground or grip coat upon which a white coat or coats are superimposed to form white enameled steel vessels. My improved mix differs in ingredients and proportions from the ingredients and proportions of such a ground or grip coat in omitting certain materials that tend to darken, such as oxid of manganese and needle antimony $Sb_2O_3$, (*i. e.*, black antimony when it is in the form of fine slivers resembling needles) in using white antimony or oxid of antimony $Sb_2O_4$, in using a smaller proportion or amount of fluorspar, and, generally, in using a larger amount or proportion of materials that tend to lighten as distinguished from those that tend to darken, and also in omitting cryolite, commonly employed in a superimposed white coat or in a white coat superimposed upon a ground or grip coat. The amounts of fluorspar and oxid of antimony, preferably employed by me, are those stated in the above formula in which the fluorspar is about one-half of that usually employed in making the ground or grip coat, and the oxid of antimony is about seven times that usually employed in making such coat, but these respective proportions may be varied widely. I find that the best results are obtained when the fluorspar is substantially less and the oxid of antimony is substantially greater than those commonly employed.

It will be understood, of course, that these materials may be somewhat varied, or other substitutes employed therefor, or the proportions may be somewhat varied, so long as the resulting batch or mixture is one that imparts suitable sticking properties to the finished enamel, and will not prevent the white-color-giving constituents, hereinafter referred to, from imparting a permanent white color to the single enameling coat.

The batch or mix thus made is melted in the usual way to form a frit. The frit is then ground in the mill with the usual amounts of water and clay, suitable for the purpose, added thereto, and is ground to the proper consistency, the same as in the ordinary treatment for preparing a dip. The quantities of water and clay that I prefer to use are:—Of water 33⅓ per cent. of the weight of the frit; of clay, 6 per cent. of the weight of the frit. The ground mixture thus obtained would, in the ordinary process of enameling upon steel, be then mixed with color-giving constituents. In my improved process, however, I preferably remove a portion of the soluble enameling constituents, such as soluble borates, silicates and the like, by allowing the mixture to stand until the heavier constituents have settled, and then I dip off the overlying layer of water with its soluble contents. The remainder, in my process, is now ready for mixture with suitable white-color-giving constituents. Any other suitable way may be used for obtaining the less amount of soluble constituents above described, such, for instance, as by putting into the batch originally less amounts of such constituents.

I then mix a suitable proportion of the mixture prepared as above with white-color-giving constituents, in such proportions as to impart to the mixture a white color when properly set up and applied as a single enameling coat to steel, without grinding the constituents of the mixture any more than is enough to mix them sufficiently, so as to preserve the coarseness of the white-color-giving constituents, to conserve their white-color-giving capacity or to prevent the grinding out of their color. I preferably accomplish this by using in the mill a relatively small number of pebbles compared to those ordinarily used in enameling processes, and I grind the mixture in the mill a relatively short time. Thus, a sufficient mixture of the various constituents is obtained, while preserving the coarseness of the white-color-giving constituents.

Any suitable white-color-giving constituents may be employed, but I prefer to use as such a mixture composed of sodium antimoniate, tin oxid, and antimony sulfid, or their equivalents, in suitable proportions. I find, in practical use, that the following proportions of these various substances give satisfactory results, namely:—To mix with 500 pounds of the mixture prepared as above, 117½ ounces of sodium antimoniate; 27½ ounces of tin oxid; and 20 ounces of antimony sulfid.

I have also successfully used, as the white-color-giving constituents, the following proportions, namely:—6½ pounds of sodium antimoniate; 2½ pounds of tin oxid; 5 ounces of red oxid of iron; 20 ounces of light magnesium carbonate; to every 500 pounds of the ground frit.

I have found that, if the mixture containing the white-color-giving constituents is ground too thoroughly or too long, it tends to destroy their white-color-giving properties when applied as a single white enameling coat to steel. Thus, if the usual amount of pebbles is used in the mill, or if the grinding is kept up too long, the white color will disappear in the product. In the methods heretofore commonly employed in grinding it is usual to fill the mill about one-half full of pebbles. I have found in practice that from about three-quarters of an hour to about an hour in grinding, with the mill about one-fourth to one-third full of pebbles, gives satisfactory results.

After this grinding, the mixture is drawn from the mill and allowed to cool. It will cool in from three to six hours, although I prefer to allow from six hours to a day. The mixture thus produced I will, for sake of convenience, refer to hereafter as the enameling mixture.

I next prepare a mixture by dissolving ammonium carbonate, or its equivalent, in water, in suitable proportions, and mix this solution, preferably while hot, with the enameling mixture prepared as above described, mixing in suitable proportions with the enameling mixture, and stirring the two until the proper consistency is obtained. The object of using ammonium carbonate is to prevent the enameling mixture when applied to the steel furnace from producing mottling in the finished enamel, and any material that will do this is an equivalent for the carbonate of ammonia.

The ammonium carbonate may be dissolved in water in any suitable way, but I preferably do this by boiling it until the ammonium carbonate is dissolved. I have found that equal weights of ammonium carbonate and water will give satisfactory results.

The ammonium carbonate solution and the enameling mixture may be combined in any suitable proportions. I have found that 8 pounds of the ammonium carbonate solution when mixed with about 500 pounds of enameling mixture produced as above described will give satisfactory results.

The mixture should be stirred actively until the desired consistency is obtained. In practice, I prefer to continue this stirring until a heavier or thicker consistency is obtained than is usually employed in the dip, for I have found that better results are obtained by diluting such a heavier consistency with water as required when the dipping of the steel vessel into the mixture is performed.

I have found that the use of the ammonium carbonate solution above described tends to prevent mottling or staining of the single white enamel coat when applied directly to steel. It does this, as I understand it, because it does not produce a strong salt, such as nitrates, chlorids, sulfates, etc., all of which tend to produce mottling.

The various steps of my improved process, the constituents used, and their proportions may, of course, be widely varied.

By my improvement, a durable, practical white enameled surface can be produced on steel by the application of a single coat directly to the steel. The surface presents as good an appearance as that of a white enameled surface that has received two or more coats, and is as free from mottling or staining.

The ordinary operations of cleaning, pickling, washing and drying of the vessels or surfaces to be enameled must be carried out with particular care, to insure complete freedom from dirt of all kinds and also from traces of acid.

In the above-described preferred method of carrying out my process, I have referred to the mixing of the other ingredients with the white-color-giving constituents as being done in a mill and by grinding. It is not essential that this mixing be done in this manner. Any suitable way or means for mixing the other ingredients and the white-color-giving constituents may be employed, and it is not essential for this purpose to use a mill, or even to grind the two together, although that is my preferred way.

What I claim as new and desire to secure by Letters Patent is:—

1. In the treatment of frit in the production of white enamel on steel, the process of grinding the frit with water and clay and removing a portion only of the soluble enameling constituents.

2. In the treatment of frit in the production of white enamel on steel, the process of grinding the frit with water and clay, allowing the mixture to stand until the heavier constituents have settled, and removing the overlying layer of water with its soluble contents.

3. In the production of a single white enameling coat on steel, the process of mixing ground frit with constituents adapted to impart a white color, when the mixture is applied as a single enameling coat to steel, grinding the constituents of the mixture only enough to mix them, whereby the coarseness of the particles of the white-color-giving constituents will be substantially preserved, in order to conserve their white-color-giving capacity.

4. In the production of a single white enameling coat on steel, the process of mixing ground frit with constituents adapted to impart a white color when the mixture is applied as a single enameling coat to steel, which consists in placing such ground frit and white-color-giving constituents in a mill not more than one third full of pebbles, and grinding such mixture in the mill only long enough to mix together its constituents, whereby a sufficient mixture of the various constituents may be obtained without destroying the white-color-giving capacity of the completed mixture.

5. In the production of a single white enameling coat on steel, the process of mixing ground frit with a white-color-giving mixture composed of sodium antimoniate, tin oxid and antimony sulfid, to impart a white color to a single enameling coat applied to steel.

6. In the production of a single white enameling coat on steel, the process of mixing ground frit with a while-color-giving mixture composed of sodium antimoniate, tin oxid and antimony sulfid, in substantially the following proportions, to wit, to five hundred pounds of ground frit, a mixture of about $117\frac{1}{2}$ ounces of sodium antimoniate, $27\frac{1}{2}$ ounces of tin oxid, and 20 ounces of antimony sulfid, to impart a white color to a single enameling coat applied to steel.

7. In the production of a single white enameling coat on steel, the process of mixing with ground frit a white-color-giving mixture composed of sodium antimoniate, tin oxid and antimony sulfid, to impart a white color, and grinding the constituents of the mixture, only enough to mix them, whereby the coarseness of the particles of the white-color-giving constituents will be substantially preserved, in order to conserve their white-color-giving capacity when applied as a single coat directly to steel.

8. In the production of a single white enameling coat on steel, the process of mixing with ground frit, a white-color-giving mixture composed of sodium antimoniate, tin oxid and antimony sulfid, and grinding the mixture for only about three-quarters of an hour to an hour in a mill not more than one third full of pebbles.

9. In the production of a single white enameling coat on steel, the process of preparing the dip, which consists in preparing an enameling mixture to form the dip which consists in dissolving carbonate of ammonia in an equal weight of water, and then mixing the solution with the enameling mixture in the proportions of about eight pounds of the solution to about five hundred pounds of the enameling mixture.

10. In the production of a single white enameling coat on steel, the process of preparing the dip which consists in preparing an enameling mixture and intimately mixing therewith a water solution of a salt of a weak acid capable of preventing a mottling effect from being produced on the finished enameled steel surface.

11. The process of making a single white enamel coat on steel which consists in making a batch or mix, smelting the batch to form a frit, grinding the frit with water and clay, removing soluble enameling constituents, such as soluble borates, silicates and the like, mixing the contents thus produced with constituents to impart to the mixture a white color when applied as a single enamel coat to steel, and grinding the constituents of the mixture only enough to mix them, whereby the coarseness of the particles of the white-color-giving constituents will be substantially preserved, in order to conserve their white-color-giving capacity.

12. The process of making a single white enamel coat on steel which consists in making a batch or mix, smelting the batch to form a frit, grinding the frit with water and clay, allowing the mixture to stand until the heavier constituents have settled, then removing the overlying layer of water with its soluble contents, mixing the contents thus produced with constituents to impart to the mixture a white color when applied as a single enamel coat to steel, and grinding the constituents of the mixture only enough to mix them, whereby the coarseness of the particles of the white-color-giving constituents will be substantially preserved, in order to conserve their white-color-giving capacity.

13. The process of making a single white enamel coat on steel which consists in making a batch or mix, smelting the batch to form a frit, grinding the frit with water and clay, allowing the mixture to stand until the heavier constituents have settled, removing the overlying layer of water with its soluble contents, mixing the contents thus produced with a white-color-giving mixture composed of sodium antimoniate, tin oxid and antimony sulfid, to impart a white color to a single enamel coat applied to steel, grinding the said mixture only sufficiently to mix the constituents thereof without destroying the coarseness of the particles of the white-color-giving substances, in order to conserve their white color.

14. The process of making a single white enamel coat on steel which consists in making a batch or mix, preparing ground frit therefrom, and mixing the same with constituents to impart to the mixture a white color when applied as a single enamel coat to steel, grinding the constituents of the mixture only enough to mix them, whereby the coarseness of the particles of the white-color-giving constituents will be substantially preserved, in order to conserve their white-color-giving capacity, mixing with the enameling mixture produced as above a hot solution of carbonate of ammonia in water, and stirring.

15. The process of making a single white enamel coat on steel which consists in making a batch or mix, preparing ground frit therefrom and mixing the same with a white-color-giving mixture composed of sodium antimoniate, tin oxid and antimony sulfid, to impart a white color to a single enameling coat applied to steel, mixing with the enameling mixture produced as above a solution of carbonate of ammonia in water, in the proportions of about eight pounds of the solution to approximately five hundred pounds of the enameling mixture, and stirring.

16. The process of making a single white enamel coat on steel which consists in making a batch or mix, preparing ground frit therefrom, and mixing the same with constituents to impart to the mixture a white color when applied as a single enamel coat to steel, grinding the constituents of the mixture only enough to mix them, whereby the coarseness of the particles of the white-color-giving constituents will be substantially preserved, in order to conserve their white-color-giving capacity, preparing a solution by dissolving in water a salt of a weak acid adapted to prevent a mottling effect from being produced on the finished enameled steel surface, mixing this solution with the enameling mixture above produced, and stirring.

17. The process of making a single white enamel coat on steel which consists in making a batch or mix, smelting the batch or mix to produce a frit, grinding the frit with water and clay, allowing the mixture to stand until the heavier constituents have settled, removing the overlying layer of water with its soluble contents, mixing the contents thus produced with constituents to impart to the mixture a white color when applied as a single enamel coat to steel, grinding the constituents of the mixture only enough to mix them, whereby the coarseness of the particles of the white-color giving constituents will be substantially preserved, in order to conserve their white-color-giving capacity in the enameling mixture thus produced, forming a solution by dissolving carbonate of ammonia in water, and then mixing the solution with the enameling mixture, and stirring.

18. In the production of a single white enameling coat on steel, the process of mixing ground frit with constituents adapted to impart a white color when the mixture is applied as a single enameling coat to steel, which consists in placing such ground frit and white-color-giving constituents in a mill not more than one-third full of pebbles, and grinding such mixture in the mill, whereby a sufficient mixture of the various constituents may be obtained without destroying the white-color-giving capacity of the completed mixture.

19. In the production of a single white enameling coat on steel, the process of mixing ground grit with constituents adapted to impart a white color when the mixture is applied as a single enameling coat to steel, which consists in placing such ground frit and white-color-giving constituents in a mill not more than one-third full of pebbles, and grinding such mixture in the mill for a time not exceeding three-quarters of an hour to an hour.

20. In making a batch or mix for a single white enamel coat on steel vessels, the use of materials for making such batch or mix including oxid of antimony, fluorspar, and black oxid of cobalt, the proportion of oxid of antimony exceeding that of the fluorspar.

21. In making a batch or mix for a single white enamel coat on steel vessels, the use of materials for making such batch or mix including oxid of antimony and fluorspar, with the amount of oxid of antimony substantially double that of the fluorspar.

22. In making a batch or mix for a single white enamel coat on steel vessels, the use of materials for the batch or mix including fluorspar and oxid of antimony, the fluorspar being less in amount than that of the oxid of antimony.

23. In making a batch or mix for a single white enamel coat on steel vessels, the use of materials for making such batch or mix including oxid of antimony, fluorspar, and black oxid of cobalt, the proportion of oxid of antimony being substantially double that of the amount of fluorspar.

24. In the production of a single white enamel coat upon steel, the process of producing ground frit, which consists in the use of materials for this purpose including materials a small amount of black oxid of cobalt, a substantial amount of fluor-spar and a still greater amount of oxid of antimony, smelting the same to form a frit, grinding the frit with water and clay, allowing the mixture to stand until the heavier constituents have settled, and removing the overlying layer of water with its soluble contents.

25. In the production of a single white enamel coat on steel, the process of mixing ground frit with constituents adapted to impart a white color thereto, grinding the mixture merely to mix its constituents and without destroying the coarseness of the particles of the white-color-giving constituents in order to conserve their white-color-giving capacity.

26. In the production of a single white enamel coat upon steel, the process of preparing the dip which consists in preparing an enameling mixture, dissolving carbonate of ammonia in water, and then mixing the solution with the enameling mixture and stirring.

27. The process of producing a single white enamel coat on steel which consists in using for the batch or mix a larger proportion of materials having lightening properties and a less proportion of materials having darkening properties, preparing the ground frit therefrom, mixing with the ground frit a white-color-giving mixture composed of sodium antimoniate, tin oxid and antimony sulfid to impart a white color to a single enameling coat applied to steel, grinding the combined mixture in a mill not more than one-third full of pebbles for a short time only, whereby a sufficient mixture of the various constituents may be obtained without destroying the white-color-giving capacity of the completed mixture.

28. The process of producing a single white enamel coat on steel which consists in using for the batch or mix a larger proportion of materials having lightening properties and a less proportion of materials having darkening properties, smelting the batch to form a frit, grinding the frit with water and clay, removing soluble enameling constituents, such as soluble borates, silicates and the like, and mixing the contents thus produced with constituents to impart to the mixture a white color when applied as a single enamel coat to steel, without grinding the constituents of the mixture any more than is necessary to mix them, whereby the coarseness of the particles of the white-color-giving constituents will be substantially preserved, in order to conserve their white-color-giving capacity.

29. The process of producing a single white enamel coat on steel which consists in using for the batch or mix a larger proportion of materials having lightening properties and a less proportion of materials having darkening properties, preparing ground frit therefrom and mixing the same with constituents to impart to the mixture a white color when applied as a single enamel coat to steel, without grinding the constituents of the mixture any more than is necessary to mix them, whereby the coarseness of the particles of the white-color-giving constituents will be substantially preserved, in order to conserve their white-color-giving capacity, mixing with the enameling mixture produced as above a hot solution of carbonate of ammonia in water and stirring.

30. The process of producing a single white enamel coat on steel which consists in using for the batch or mix a larger proportion of materials having lightening properties and a less proportion of materials having darkening properties, preparing ground frit therefrom, and mixing the same with constituents to impart to the mixture a white color when applied as a single enamel coat to steel, without grinding the constituents of the mixture any more than is necessary to mix them, whereby the coarseness of the particles of the white-color-giving constituents will be substantially preserved, in order to conserve their white-color-giving capacity, preparing a solution by dissolving in water a salt of a weak acid adapted to prevent a mottling effect from being produced on the finished enameled steel surface, mixing this solution with the enameling mixture above produced, and stirring.

31. The process of producing a single white enamel coat on steel which consists in using for the batch or mix a larger proportion of materials having lightening properties and a less proportion of materials having darkening properties, smelting the same to form a frit, grinding the frit with water and clay, allowing the mixture to stand until the heavier constituents have settled, and removing the overlying layer of water with its soluble contents.

32. Ground frit for use in making a single white enamel coat upon steel having the more soluble enameling constituents of the batch or mix removed therefrom.

In testimony whereof I have signed my name to this specification.

SIMON RIESER.